INVENTOR.
WILLIAM R. SALVESEN

BY Auslander & Thomas

ATTORNEYS.

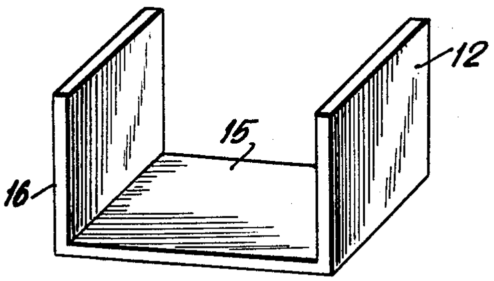
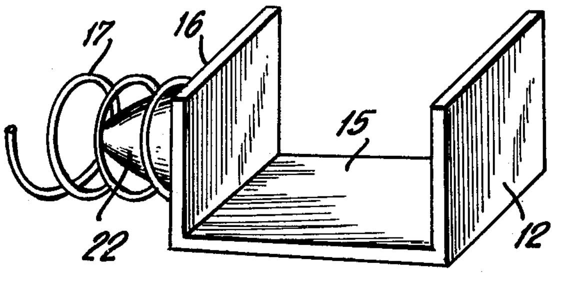
FIG. 4
FIG. 4a
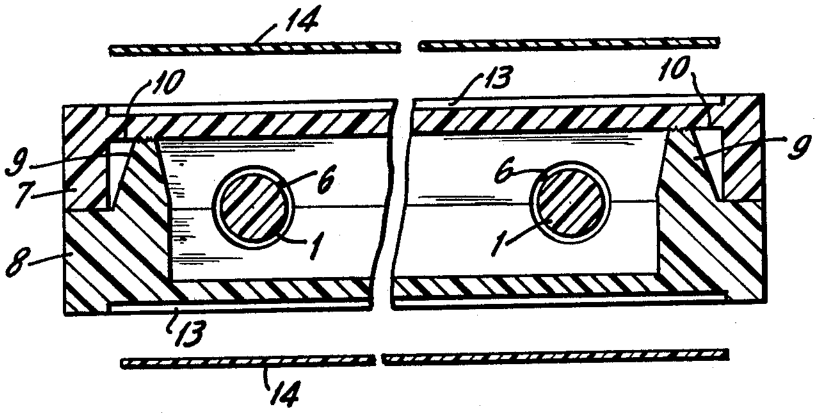
FIG. 5
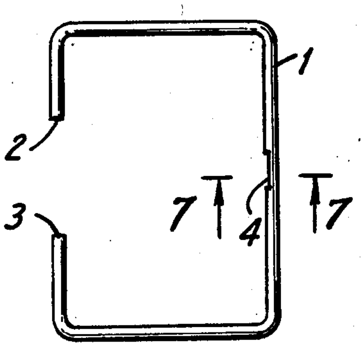
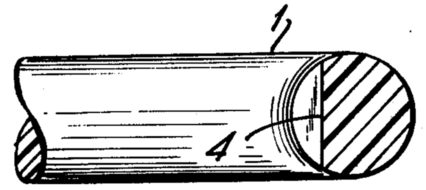
FIG. 6
FIG. 7
INVENTOR.
WILLIAM R. SALVESEN
BY Auslander & Thomas
ATTORNEYS.

Nov. 18, 1969 W. R. SALVESEN 3,478,550

KEY RETAINING DEVICE

Filed Jan. 17, 1967 5 Sheets-Sheet 3

INVENTOR.
WILLIAM R. SALVESEN

BY Auslander + Thomas

ATTORNEYS

KEY RETAINING DEVICE

INVENTOR.
WILLIAM R. SALVESEN

BY
Auslander & Thomas
ATTORNEYS.

INVENTOR.
WILLIAM R. SALVESEN
BY Auslander & Thomas
ATTORNEYS.

3,478,550
KEY RETAINING DEVICE

William R. Salvesen, 515 Grant St., Linden, N.J. 07036

Filed Jan. 17, 1967, Ser. No. 609,940
Int. Cl. A45c *11/32;* A44b *15/00*
U.S. Cl. 70—459 2 Claims

ABSTRACT OF THE DISCLOSURE

The present invention provides an easily assembled key retaining device adapted to retain keys or other similar articles, the key retainer adapted to be of varying symmetrical or asymmetrical shapes having one or more key retention portions, the retainer having a locking means between a moveable housing and the body of the key retainer internal of the housing wherein a portion of the formed body in the area of the lock provides a surface upon which the lock in released position is adapted to ride upon.

The present invention relates to a key retainer including a moveable lock.

Many varieties of key retainers have been known in the past including those of the so-called "ring" type which are readily adapted to be carried on the end of a chain or as single independent key carriers. Key retainers of this variety are generally constructed of a single wire loop with an opening provided between ends of the loop to allow for insertion or removal of keys from the loop.

In an attempt to provide for easier insertion and/or removal of the keys from the retainer and/or insure against undesired falling off of keys, numerous devices were employed, such as by the provision of an opening along the length of the loop and the insertion thereon of a separate closure element which was in many instances maintained in position by the spring force of the loop itself. While such devices did provide for easier insertion and/or removal, the non-integrity of the closure element with the retainer could lead to the misplacing of such element or loss of the same, especially after long use wherein the tensile strength of the loop would dissipate and the closure element could not be maintained thereon.

Integral locks or closures were developed, however they were generally limited to a well defined loop configuration. Devices such as those including an integral lock such as in the nature of a cylindrical latch casing provided on the key retainer which divided the ring into two loops, overcame many of the deficiencies of the prior devices. Such device generally necessitated the use of a guard to prevent undesired actuation of the lock and was additionally relatively expensive to manufacture due to the method of assembly which required the loading of the locking mechanism in the casing, sliding of the latch casing up and around the key loop wire and twisting the key loop wire openings to be juxtaposed and setting of the lock. As in prior devices, this assembly problem in conjunction with the necessity of a guard on the key retainer substantially limited the shape of the key retainer to a generally symmetrical bell configuration.

Such device also included an inherent limitation with regard to the key loop structure in that it had to be bent in assembly and insertion of the lock on the loop and perforce had to be of a metallic substance or the like which could be bent in assembly into operable position.

According to the present invention as easily assembled key retaining device is provided adapted to retain keys or other similar articles, and if desired, be attached to a chain. The key retainer is adapted to be of varying symmetrical or asymmetrical shapes having one or more key retention portions, the retainer having a locking means between a moveable housing and the body of the key retainer internal of the housing. The housing and key retainer are easily assembled with the housing further adapted to be provided with a substantially flat or recessed flat outer surface which may be utilized for the inclusion thereon of advertising materials, identification material or other material.

The housing itself may be made in an infinite variety of shapes thereby providing greater style or commercial adaptations for the key retainer.

The shape of the body of the key retainer may be varied and as aforementioned, either symmetrical or asymmetrical, so long as a portion thereof in the area of the lock provides a surface wherein the lock in longitudinal relationship is adapted to ride along a portion thereof. The housing, if desired, may, due to its ease of assembly and varied shapes, be positioned on the body of the key retainer so that the key retention portion or portions of the retainer will act as an integral stop for the moveable housing.

Although such novel feature or features believed to be characteristics of the invention are pointed out in the claims, the invention and the manner in which it may be carried out may be further understood by reference to the description following and the accompanying drawings.

Figure 3:
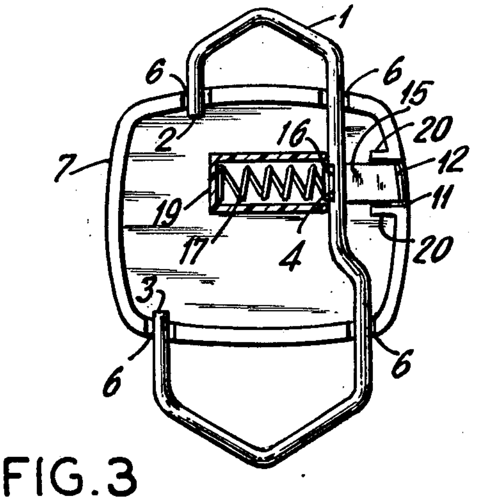
FIG. 3 is a view taken along lines 3—3 of FIG. 2.
Figure 3A:
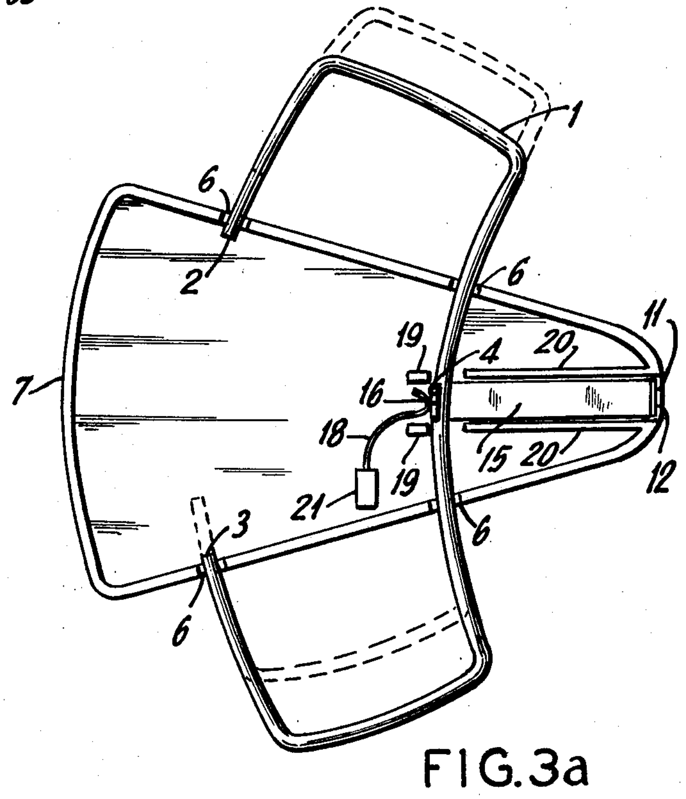

FIG. 3*a* is a front section of another embodiment of the present invention.

FIG. 4 is a perspective view of a lock latch of the present invention.

FIG. 4*a* is another embodiment of a lock latch of the present invention.

Figure 2:
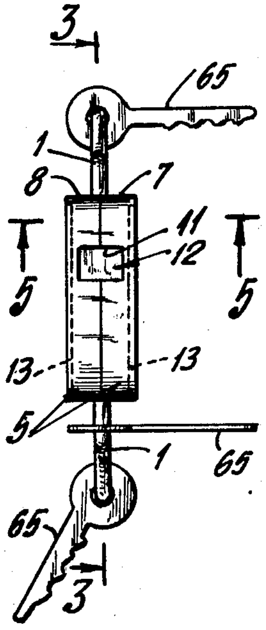
FIG. 2 is a side elevation of a key retainer of the present invention.

FIG. 5 is a partially exploded view along lines 5—5 of FIG. 2.

FIG. 6 is a front elevation of a loop configuration of the present invention.

FIG. 7 is a view taken along lines 7—7 of FIG. 6.

Figures 8, 8A, 8B:
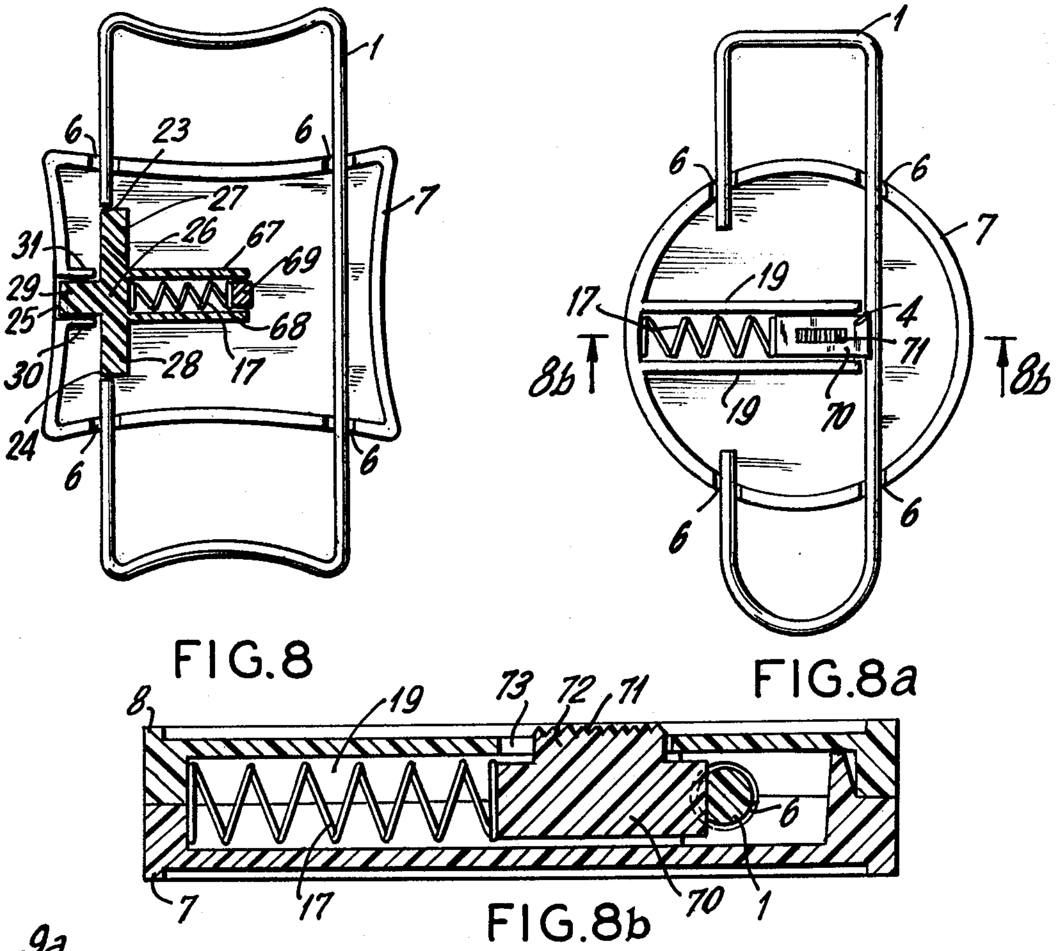

FIG. 8 is a front elevation section view of another embodiment of the present invention.

FIG. 8*a* is a front section view of another embodiment of the present invention.

FIG. 8*b* is a view taken along lines **8*b*—8*b*** of FIG. 8*a*.

Figures 9, 9A:
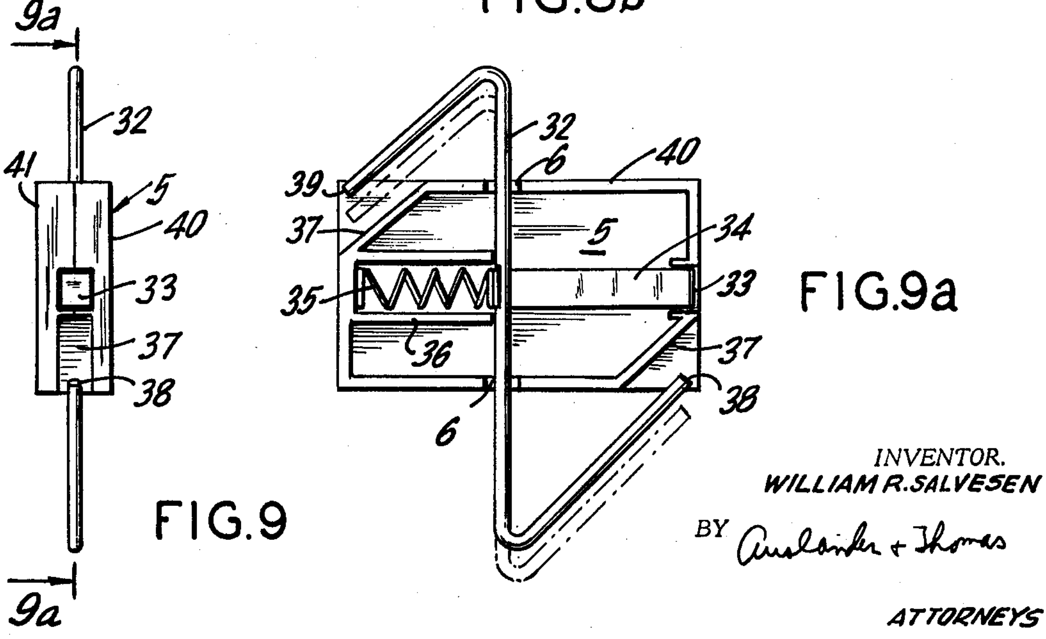

FIG. 9 is a front elevation of another embodiment of the present invention.

FIG. 9*a* is a view taken along lines **9*a*—9*a*** of FIG. 9.

Figure 10:
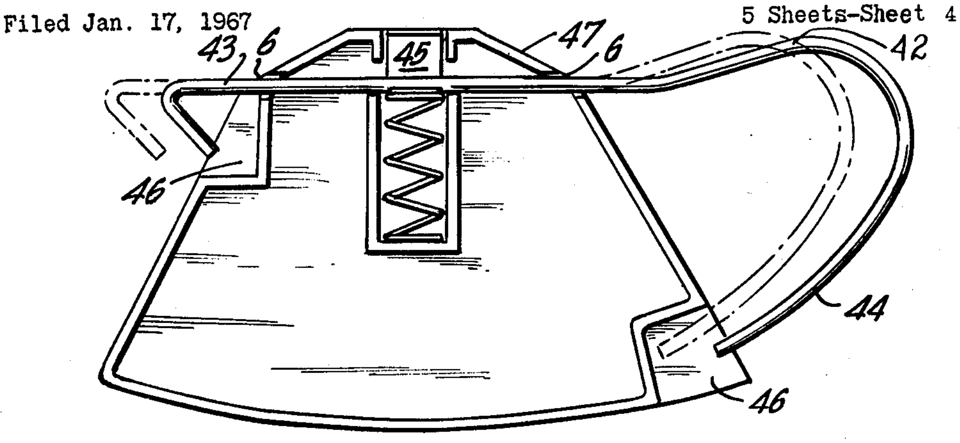
Figure 11:
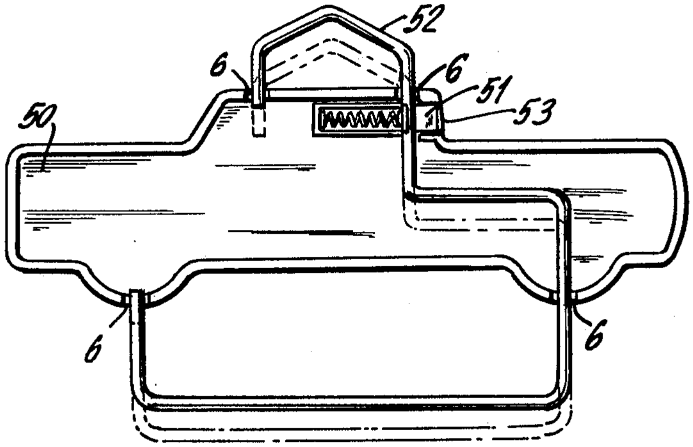

FIGS. 10 and 11 are front elevation section views of other embodiments of the present invention.

Figure 12:
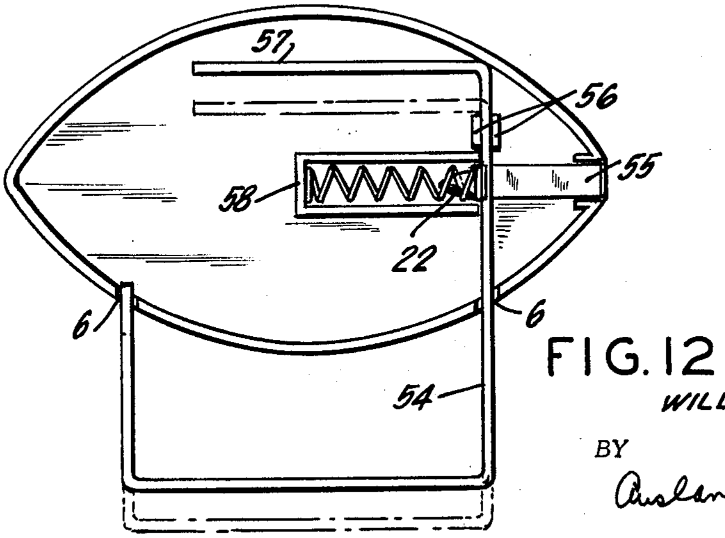

FIG. 12 is a front elevation section view of an embodiment of the present invention having a single retaining loop.

Figures 12A, 13, 13A, 14:
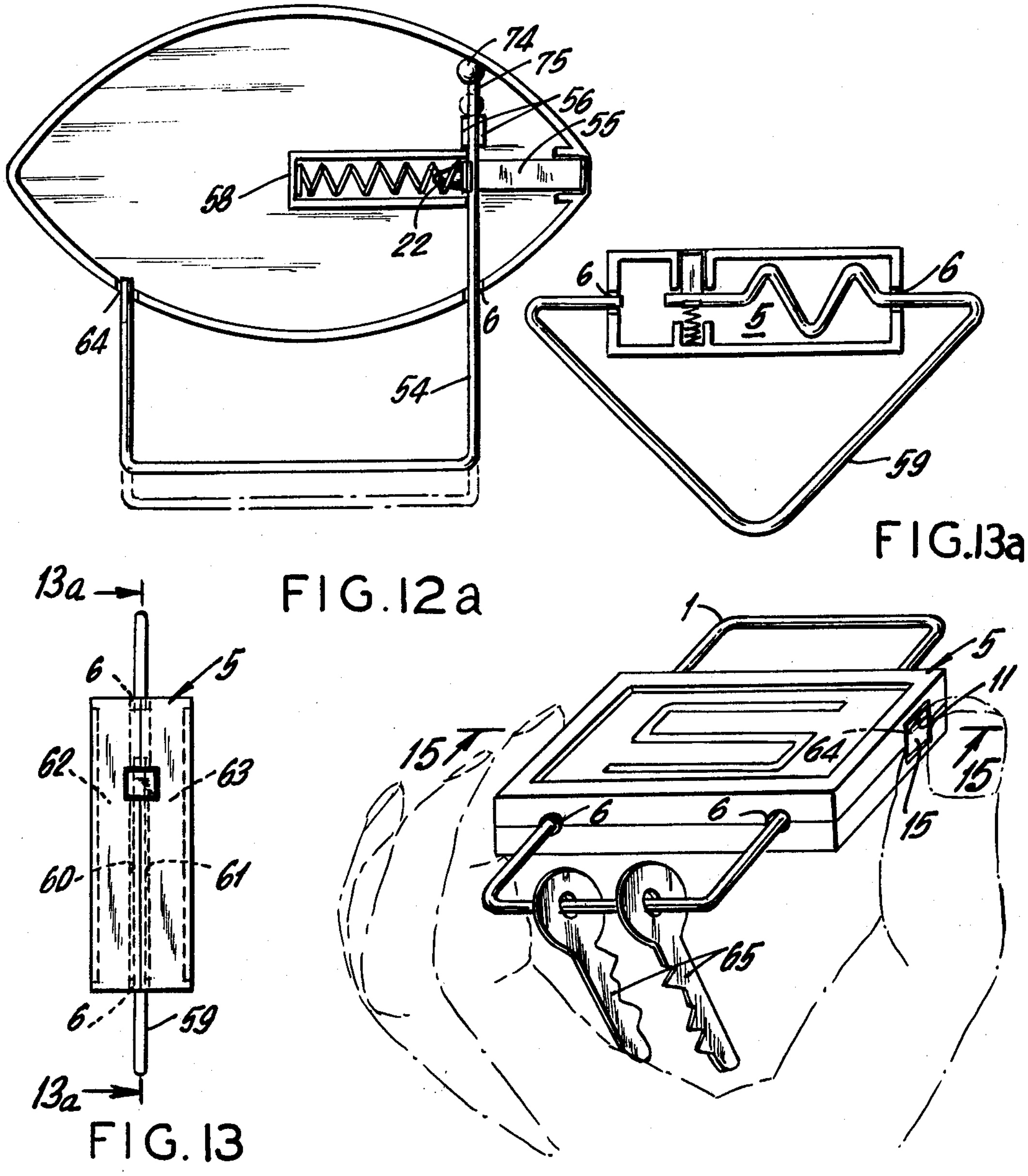

FIG. 12*a* is a front elevation section view of another single loop embodiment of the present invention.

FIG. 13 is a front elevation section view of another embodiment of the present invention.

FIG. 13*a* is a view taken along lines 13*a*—13*a* of FIG. 13.

FIG. 14 is a detail section showing actuation of the lock release of the present invention.

Figure 15:
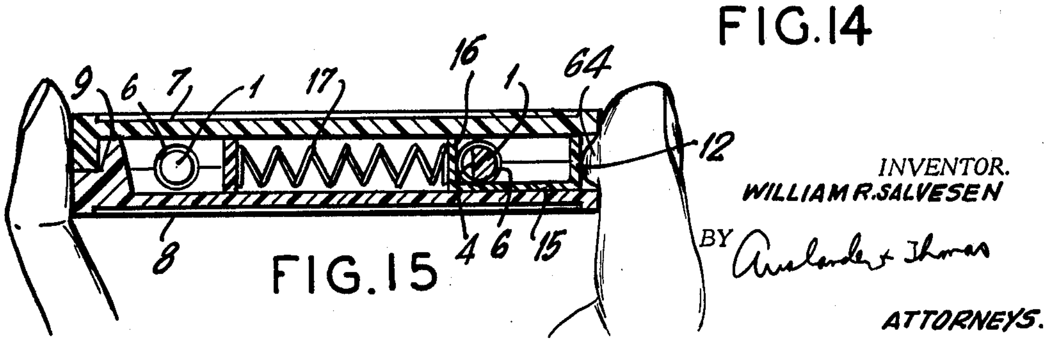

FIG. 15 is a view taken along lines 15—15 of FIG. 14 showing actuation of locking means.

Referring now to the figures in greater detail, where like reference numbers denote like parts in the various figures.

As shown in FIGS. 1–7, the key retainer comprises a formed body 1 made so as to provide an open portion between the ends 2, 3 thereof. The loop configuration as shown in FIGS. 1–7 is exemplary of an infinite variety of shapes providable.

The formed body 1 includes a notch 4, and as shown in FIG. 7 the notch 4 is preferably transverse with respect to a side of formed body 1.

The moveable lock is carried within a housing 5, preferably a plastic molding or metal die casting, riveted or ultrasonically welded of two pieces over formed body 1 so as to be slidably mounted on the formed body 1 through guide channels 6 formed in the housing 5. The housing 5 rides on the formed body 1 on the guide channels 6.

Figure 1:
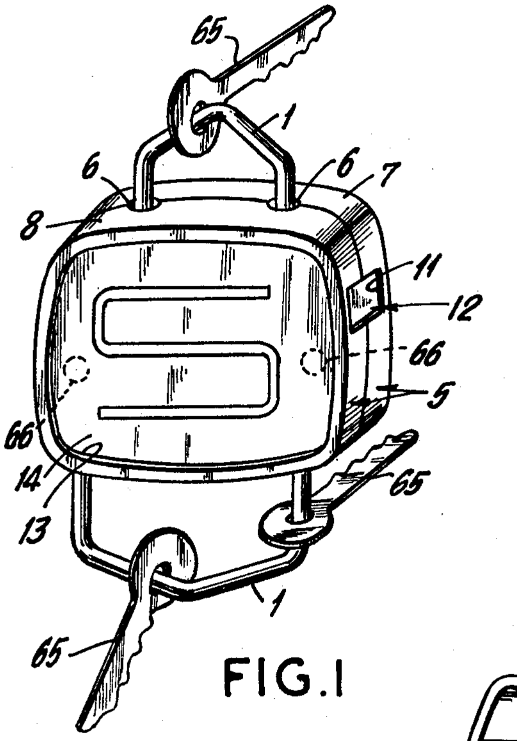
FIG. 1 is an isometric view of a key retainer of the present invention in use.

Each side 7, 8 of housing 5 can be formed to facilitate joining either by rivets 66 shown in phantom in FIG. 1 or as illustrated in FIG. 5 by the inclusion of a flange 9 extending inward from, for example, side 8 to be positioned within a declivity 10 in side 7. The flange 9 if desired can be slightly longer than declivity 10 so as to be positioned therein for ultrasonic welding insuring a strong mating of sides 7, 8 after welding.

An opening 11 is provided preferably along one of the end lengths of housing 5 adapted to receive the button portion 12 of the lock. Sides 7, 8 of housing 5 may be made in a variety of shapes; and as shown in FIGS. 1, 2 and 5 may be adapted to carry advertising or other matter thereon such as by the provision on either or both of sides 7, 8 of a relatively large somewhat centrally positioned inset portion 13 adapted to receive mated inserts 14 or including such indicia or design on sides 7, 8 by die stamping or other known means.

The locking means comprises a latch 15 which may be of any desired peripheral shape having a substantially U-shaped internal configuration, one side of which fits within opening 11 of housing 5 to act as button portion 12. The base of the U extends inward of housing 5 beyond formed body 1 in the area of notch 4, the other side or locking portion 16 of the U adapted to fit within the notch 4.

Spring means such as a coil spring 17 as shown in FIG. 3 or a leaf spring 18 such as shown in FIG. 3*a* butt the rear portion of latching portion 16, maintaining latching portion 16 within notch 4, locking housing 5 in fixed position on formed body 1.

An integral casing 19 may be provided within housing 5 to serve as a maintaining mount for coil spring 17 and as a guide for latch 15. An additional guide can be provided by flanges 20 extending inward of housing 5 from opening 11.

Where, as shown in FIG. 3*a*, a leaf spring 18 is employed affixed within housing 5 by conventional means such as on a pin 21, guide flanges 20 may be elongated so as to extend along a portion of and parallel to the sides of the base of the latch 15. As shown in FIG. 3*a* the formed body 1 internal of the housing 5 may be arcuate.

As shown in FIG. 4*a*, a rearwardly projecting flange 22 may be provided on locking portion 16 allowing for the affixation of coil spring 17 and additionally serves as an additional guide for latch 15.

By selective shaping of body portion 1 and positioning of notch 4, either a two loop retainer such as illustrated in FIGS. 1–7 and 9–11, or a single loop configuration such as shown in FIGS. 12–13 can be provided.

As shown in FIG. 8, an alternative lock may be employed within housing 5 eliminating the necessity of a notch 4 on the body portion 1. The housing 5 is constructed in a manner heretofore described and may include casing 19 for the coil spring 17 such as is shown in FIG. 3 or a leaf spring arrangement such as shown in FIG. 3*a*. Block 25 provides the lock, block 25 comprising a main body portion 26 having side flanges 27, 28 projecting outwardly of the block 25 so as to substantially fit within the opening provided between ends 23 and 24 of body portion 1. Block 25 is maintained in its relative position within housing 5 by guides 30 and 31, and in its locked position by spring 17.

The block 25 may include as is shown in FIG. 8, rearward extension flanges 67, 68 which act as an integral casing for spring 17, spring 17 mounted on mounting block 69, so that upon release of the lock by pressure upon button end 29 of block 25, block 25 rides between guides 30, 31 inward of housing 5 and flanges 67, 68 additionally acting as guides about mounting block 69. Upon movement of either housing 5 or body portion 1 in either upward or downward direction, either side flange 27 or 28 rests upon body portion ends 23 or 24, thereby exposing the open portion of body portion 1 for the insertion or removal of keys, or a chain or the like.

FIGS. 8*a* and 8*b* illustrate another form of lock configuration of the present invention. The lock comprises a block 70.

An upward extending portion or rib 71 on block 70 is adapted to project through an elongated opening 73 provided through a side of the housing 5. As shown, the outer surface of extending portion or rib 71 has serrations 72 to facilitate gripping for release. It is preferable that opening 73 be of a narrower configuration than block 70 while still allowing the extending portion or rib 71 to project therethrough.

The block 70 is held in position by spring means such as the spring 17 shown, one end of the block 70 adapted to fit within notch 4 when in locked position and released by pushing back block 70 by exerting a force on rib 71, the rib 71 slideable within elongated opening 73.

FIGS. 9–13*a* illustrate various combinations of housing 5 and body portion 1 shapes, both symmetrical or asymmetrical as exemplifications of the flexibility of the present invention allowing a myriad of combinations which can be economically manufactured based upon the teachings of the present invention.

Referring to FIGS. 9, 9*a*, a substantially Z-shaped body portion 32 is employed with housing 5. The latch 33 is of the same basic configuration of latch 15, however, the base portion 34 of latch 33 is elongated. While a coil spring 35 and casing 36 configuration is shown, it should be noted that a leaf spring arrangement as heretofore described is similarly employable. A recess 37 is located on two opposing corners of housing 5 adapted to accept the respective end portions 38, 39 of the Z-shaped body portion 32. The recesses 37 can be readily provided in housing 5 by inclusion on sides 40, 41 of housing 5 a portion thereof so that the recesses 37 will be provided when sides 40, 41 are joined.

As in each of the embodiments, guide channels 6 are provided within housing 5 so that it may ride on body portion 32. The ends of the Z of the body portion 32 provide the retention portions of the retainer.

FIG. 10 depicts a teapot shaped housing 47 configuration having the end portions 43, 44 of the body portion 42 representing the spout and handle of the teapot. The latch 45 is of the same general construction as heretofore described. Recesses 46 are provided in teapot shaped housing 47 adapted to receive the ends 43, 44 of body portion 42, the recesses provided between the outer walls of the teapot shaped housing 47 in a like manner as recesses 37 of FIGS. 9, 9*a*. The recesses 46 of teapot shaped housing 47 provide the retention portions of the retainer.

FIG. 11 shows in section a portion of a housing 50 shaped as an automobile, the latch 51 being of the type heretofore described. Since the body portion 52 can be formed into an infinite variety of shapes, so long as a portion thereof in the area of the lock is adapted to allow the lock to ride along a portion thereof upon the release of the lock and the upward or downward movement of the housing, the body portion 50, as in the case of the automobile of FIG. 11 can be of a configuration as to provide for the positioning of guide channels 6 at aesthetically desirable areas, such as having the guide channels 6 in the area of the wheels and roof of the automobile and the button portion 53 of latch 51, in for example, the automobile windshield.

FIG. 12 illustrates the use of the device of the present invention so as to provide a key retainer with a single loop if desired. As in all the figures, an infinite variety of shapes are possible so long as provision is made for upward and/or downward movement.

As shown in FIG. 12, the body portion 54 is substantially J shaped. Guide channels 6 and lock 55 are provided within the housing as heretofore described. If desired, a pair of guide flanges 56 can be additionally provided within the housing 5 as heretofore described. If desired, a pair of guide flanges 56 can be additionally provided within the housing although they are not critical. The body portion 54 is shaped so as to provide a transverse top portion 57 on the J which acts as a downward stop either by intersecting guide flanges 56 as shown in phantom, if provided, or spring casing 58. Transverse portion 57 also prevents possible rotation of body 54 when body 54 is in disengaged position.

Where rotation is desired as shown in FIG. 12*a*, the body portion 54 is provided with a ball end 74, the ball end 74 either an integral part of body portion 54 or separately affixed to the end portion 75 of the J, the transverse top portion 57 being eliminated from the J.

It is generally unnecessary to provide means for upward and/or downward stop such as guide flanges 56 of FIG. 12 since in most instances, the varying shapes of the retention end of the body portion and/or the varying shapes of the housing 5 itself provide an integral stop to the housing by inhibiting the distance along the length of the body portion which the housing 5 can travel in the guide channels 6.

In key retainers where it is desired that only one loop be had such as the devices of FIG. 12 or 13, 13*a*, the housing 5, when the retainer is in open position, that is, when the open end of the body portion is exposed is only guided through a single channel 6. In such instances, or in other embodiments wherein more than one guide channel 6 is provided, but are so aligned that upon release of the lock from notch 4 the housing can pivotally rotate, the body portion 59, as shown in FIGS. 13, 13*a* can be shaped in a vertical zig zag manner so that portions of the body portion 59 butt the side inner portions of the housing 5. The shape of the body portion 59 allows for a straight portion in the area of the lock where the zig zag configuration is employed. The body portion 59 is maintained in vertical position by the inner sides 60, 61 of the sides 62, 63 of the housing 5 or by channels 6 within housing 5 for such purpose.

In operation, the housing 5 is positioned over the body portion 1 which has been shaped in a desired manner as hereinbefore described. The release of the latch is accomplished such as is depicted in FIG. 14 wherein a user applies pressure from his finger to the button 12 thereby moving locking portion 16 away from notch 4 or as in FIG. 8, from within its position between the open ends of the body portion, the housing 5 can be moved either upward and/or downward depending upon the configuration of the body portion 1 so as to expose an open portion of the body portion 1 for the insertion and/or removal of a key or the affixation or removal of the key retainer from a chain.

To close and lock the retainer, the housing 5 or the body portion 1 depending upon the convenience of the user is moved so that the locking portion 16 will pass over the notch 4 or back within the open area (FIG. 8). The force of the spring means (either coil spring 17 or leaf spring 18) on the locking portion 16 will lock into engagement with notch 4 or within the open area of FIG. 8.

As seen in FIGS. 1, 14 and 15, the button portion 12 can be recessed within opening 11 and button portion 12 can be pressed by the simple pressure readily applicable by the fleshy part of a finger 64. Recessing of the button portion 12 serves to guard against undesired release of the lock by the accidental application of pressure by other objects or even by the keys 65 themselves.

Having thus described certain forms of the invention in some detail, what is claimed is:

1. A key retaining device comprising a substantially hollow housing including first and second longitudinal portions adapted to be fixedly joined; said housing including a plurality of guide channels; an opening in said housing; a substantially inflexible formed body; said formed body having at least one object retaining portion and at least one free end in the area of said object retaining portion; said formed body moveably mounted in said housing guided by said guide channels; said free end adapted to be engaged within the periphery of said housing and moveable to extend beyond the periphery of said housing; and locking means; said locking means adapted to engage said formed body to maintain said formed body in fixed position with respect to said housing with said free end within the periphery of said housing; said locking means including a substantially T-shaped portion adapted to fit within the free ends of said formed body in locked position; spring means juxtaposed to the head of said T-shaped portion adapted to bias a leg of said T-shaped portion towards said opening in said housing to form a release portion; integral parallel arms extending vertically from the top of said T-shaped portion to form a spring enclosure; and a fixed mounting between said parallel arms for a portion of said spring; guide means adapted to guide said release portion, said release portion maintained in substantially flush relationship with the periphery of said housing within said housing opening, a portion of said locking means adapted to ride along a portion of said formed body when in released position.

2. A key retaining device comprising a substantially hollow housing including first and second longitudinal portions adapted to be fixedly joined; said housing including a plurality of guide channels; an opening in said housing; a substantially inflexible formed body; said formed body having at least one object retaining portion and at least one free end in the area of said object retaining portion; said formed body moveably mounted in said housing guided by said guide channels; said free end adapted to be engaged within the periphery of said housing and moveable to extend beyond the periphery of said housing; said formed body including a substantially zig-zag shaped portion internal of said housing, a portion of said zig-zag shaped portion vertically and transversely butting said housing, a section of said zig-zag portion butting an inner wall within said housing when said free end is disengaged to act as a stop for longitudinal movement of said formed body within said housing, and locking means; said locking means adapted to engage said formed body to maintain said formed body in fixed position with respect to said housing with said free end within the periphery of said housing; said locking means including a spring actuable release portion, guide means adapted to guide said release actuating portion, said release actuating portion maintained in substantially flush relationship with the periphery of said housing within said housing opening, a portion of said locking means adapted to ride along a portion of said formed body when in released position.

References Cited

UNITED STATES PATENTS

| | | | |
|---|---|---|---|
| 486,419 | 11/1892 | Pearson et al. | 70—459 X |
| 1,141,992 | 6/1915 | Toelcke | 24—3 |
| 1,571,425 | 2/1926 | Mataloni | 70—459 |
| 2,129,436 | 9/1938 | Murray | 70—459 |
| 2,307,808 | 1/1943 | Segal | 70—459 X |
| 2,694,844 | 11/1954 | Grumbach | 70—459 X |
| 2,823,537 | 2/1958 | Segal | 70—459 |
| 2,855,775 | 10/1958 | Marien | 70—459 |
| 3,257,696 | 6/1966 | Miller et al. | 70—456 X |
| 3,286,315 | 11/1966 | Price | 24—238 |

FOREIGN PATENTS

| | | |
|---|---|---|
| 143,853 | 10/1951 | Australia. |
| 928,705 | 6/1947 | France. |
| 1,049,040 | 8/1953 | France. |
| 445,005 | 2/1949 | Italy. |
| 614,224 | 12/1960 | Italy. |

MARVIN A. CHAMPION, Primary Examiner

ROBERT L. WOLFE, Assistant Examiner